(12) United States Patent
Odai et al.

(10) Patent No.: US 10,363,896 B2
(45) Date of Patent: Jul. 30, 2019

(54) OCCUPANT PROTECTION DEVICE

(71) Applicant: HONDA MOTOR CO., LTD, Minato-ku, Tokyo (JP)

(72) Inventors: Shinsuke Odai, Saitama (JP); Kento Maeda, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/795,342

(22) Filed: Oct. 27, 2017

(65) Prior Publication Data
US 2018/0118149 A1    May 3, 2018

(30) Foreign Application Priority Data
Nov. 1, 2016    (JP) .................................. 2016-214302

(51) Int. Cl.
| | | |
|---|---|---|
| *B60R 21/206* | (2011.01) | |
| *B60R 21/20* | (2011.01) | |
| *B60R 21/00* | (2006.01) | |
| *B60R 21/01* | (2006.01) | |
| *B60R 21/231* | (2011.01) | |

(52) U.S. Cl.
CPC ............ *B60R 21/206* (2013.01); *B60R 21/20* (2013.01); *B60R 2021/0051* (2013.01); *B60R 2021/01006* (2013.01); *B60R 2021/23169* (2013.01)

(58) Field of Classification Search
CPC .................. B60R 21/20; B60R 21/206; B60R 2021/01006; B60R 2021/23169; B60R 2021/0051
See application file for complete search history.

(56) References Cited

U.S. PATENT DOCUMENTS

2010/0253050 A1*  10/2010  Mitsuo ............... B60R 21/2032
                                                                    280/730.1
2010/0317202 A1*  12/2010  Coiffier ................... B62D 5/04
                                                                    439/34

(Continued)

FOREIGN PATENT DOCUMENTS

| JP | 2004-276882 | 10/2004 |
|---|---|---|
| JP | 2005-096625 | 4/2005 |

(Continued)

OTHER PUBLICATIONS

Hotta et al., Knee Protection Airbag Apparatus, Apr. 14, 2005, JPO, JP 2005-96625 A, Machine Translation of Description (Year: 2005).*

(Continued)

*Primary Examiner* — James A English
(74) *Attorney, Agent, or Firm* — Amin, Turocy & Watson LLP

(57) ABSTRACT

Provided is an occupant protection device which is disposed together with an under-cover of an instrument panel, has a harness connected to an inflator and protects a knee portion of an occupant, including a case in which a first surface is disposed along a lower end of the under-cover and the harness is disposed on a side surface intersecting the first surface and extending in forward and backward direction of a vehicle, and an overhanging portion configured to protrude from a side surface of the case on a lower side of the harness in a vehicle width direction.

5 Claims, 6 Drawing Sheets

(56) References Cited

U.S. PATENT DOCUMENTS

| | | | |
|---|---|---|---|
| 2011/0204603 A1* | 8/2011 | Fukawatase | B60R 21/206 280/730.1 |
| 2018/0065586 A1* | 3/2018 | Takebayashi | B60R 21/206 |
| 2018/0118152 A1* | 5/2018 | Odai | B60R 21/206 |

FOREIGN PATENT DOCUMENTS

| | | |
|---|---|---|
| JP | 2010-064626 | 3/2010 |
| JP | 4466472 | 5/2010 |
| JP | 2010-241191 | 10/2010 |
| JP | 2011-506202 | 3/2011 |
| JP | 2013-063759 | 4/2013 |

OTHER PUBLICATIONS

Japanese Office Action for Japanese Patent Application No. 2016-214302 dated Jun. 19, 2018.

* cited by examiner

OCCUPANT PROTECTION DEVICE

CROSS-REFERENCE TO RELATED APPLICATION

Priority is claimed on Japanese Patent Application No. 2016-214302, filed Nov. 1, 2016, the content of which is incorporated herein by reference.

BACKGROUND OF THE INVENTION

Field of the Invention

The present invention relates to an occupant protection device.

Description of Related Art

A knee airbag device for protecting a knee portion of an occupant by inflating and deploying a bag body in front of a front seat at the time of an input of an impact is known as an occupant protection device of a vehicle. In the knee airbag device, a bag body and an inflator are disposed in a case. The case is covered with a cover portion, and the inflator is disposed so that an end portion thereof faces an opening of the cover portion. A wire harness (hereinafter, referred to as a harness) is connected to the end portion of the inflator from an opening side.

After the harness is connected, the opening is closed by a lid body, the harness thus being protected (refer to, for example, Japanese Unexamined Patent Application, First Publication No. 2010-241191).

SUMMARY OF THE INVENTION

However, in the occupant protection device of Japanese Unexamined Patent Application, First Publication No. 2010-241191, in order to protect the harness, it is necessary to close the opening with the lid body after connecting the harness to the end portion of the inflator. Accordingly, it takes time to connect the harness.

An aspect of the present invention has been made in view of such circumstances, and an object thereof is to provide an occupant protection device which is capable of protecting a harness and in which the harness is also able to be installed easily.

In order to solve the above problem, the present invention adopts the following aspects.

(1) An occupant protection device according to the present invention which is disposed together with an under-cover of an instrument panel and has a harness connected to an inflator to protect a knee portion of an occupant, includes a case in which a first surface is disposed along a lower end of the under-cover and the harness is disposed on a side surface intersecting the first surface and extending in forward and backward direction of a vehicle, and an overhanging portion configured to protrude from a side surface of the case on a side below the harness in a vehicle width direction.

As described above, the harness is connected to the inflator, and the connected harness is disposed on the side surface of the case. The overhanging portion protrudes from the side surface of the case on the side below the harness. Thus, the harness can be protected by the overhanging portion.

Also, the harness can be connected to the inflator above the overhanging portion. Therefore, unlike in the prior art, it is not necessary to close an opening with the lid body after connecting the harness to the inflator. Accordingly, the harness can be easily installed on the inflator.

(2) In the aspect of (1), the harness may be connected to the inflator by a connector.

Here, the overhanging portion protrudes from the side surface of the case on the lower side of the harness in the vehicle width direction. Therefore, a space required for connecting the connector to the inflator can be secured above the overhanging portion. As a result, it is possible to easily connect the harness to the inflator with the connector.

(3) In the aspect of (2), one end portion of the overhanging portion in the forward and backward direction of the vehicle may be provided between the connector and an end portion of the under-cover on a lower end side in the side surface.

As described above, one end portion of the overhanging portion is provided between the connector and the end portion of the under-cover on a lower end side. Therefore, one end portion of the overhanging portion can be spaced apart from the lower end of the under-cover toward a front side of a vehicle compartment. Accordingly, it makes an occupant hardly visually recognize the overhanging portion from a vehicle compartment side, and a design of the vehicle compartment can be enhanced.

(4) In the aspect of any one of (1) to (3), the harness may be fixed at a position which is spaced apart from the inflator, and the overhanging portion may extend to a position corresponding to a downward direction in the vehicle at the position at which the harness is fixed.

As described above, the harness is fixed to a vehicle body at a position spaced apart from the inflator (i.e., at a fixed position). Further, the overhanging portion extends to a corresponding position of the fixed position in a lower direction of the vehicle.

Therefore, between the inflator and the fixed position, movement of the harness due to a load acting on the harness from the vehicle compartment side can be prevented by the overhanging portion. Thus, a connection portion between the inflator and the harness can be protected.

(5) In the aspect of any one of (1) to (4), an operating pedal may be located below the case, and the overhanging portion may be disposed on an operating pedal side of the harness.

As described above, the overhanging portion is disposed on the operating pedal side of the harness. This makes it possible to reliably protect the harness from a foot of the occupant who operates the operating pedal with the overhanging portion.

According to this aspect of the present invention, the overhanging portion protrudes from the side surface of the case on the lower side of the harness. Therefore, the harness can be protected by the overhanging portion. In addition, the harness can be connected to the inflator above the overhanging portion. As a result, the harness can be easily installed on the inflator.

DETAILED DESCRIPTION OF THE INVENTION

Figure 1:
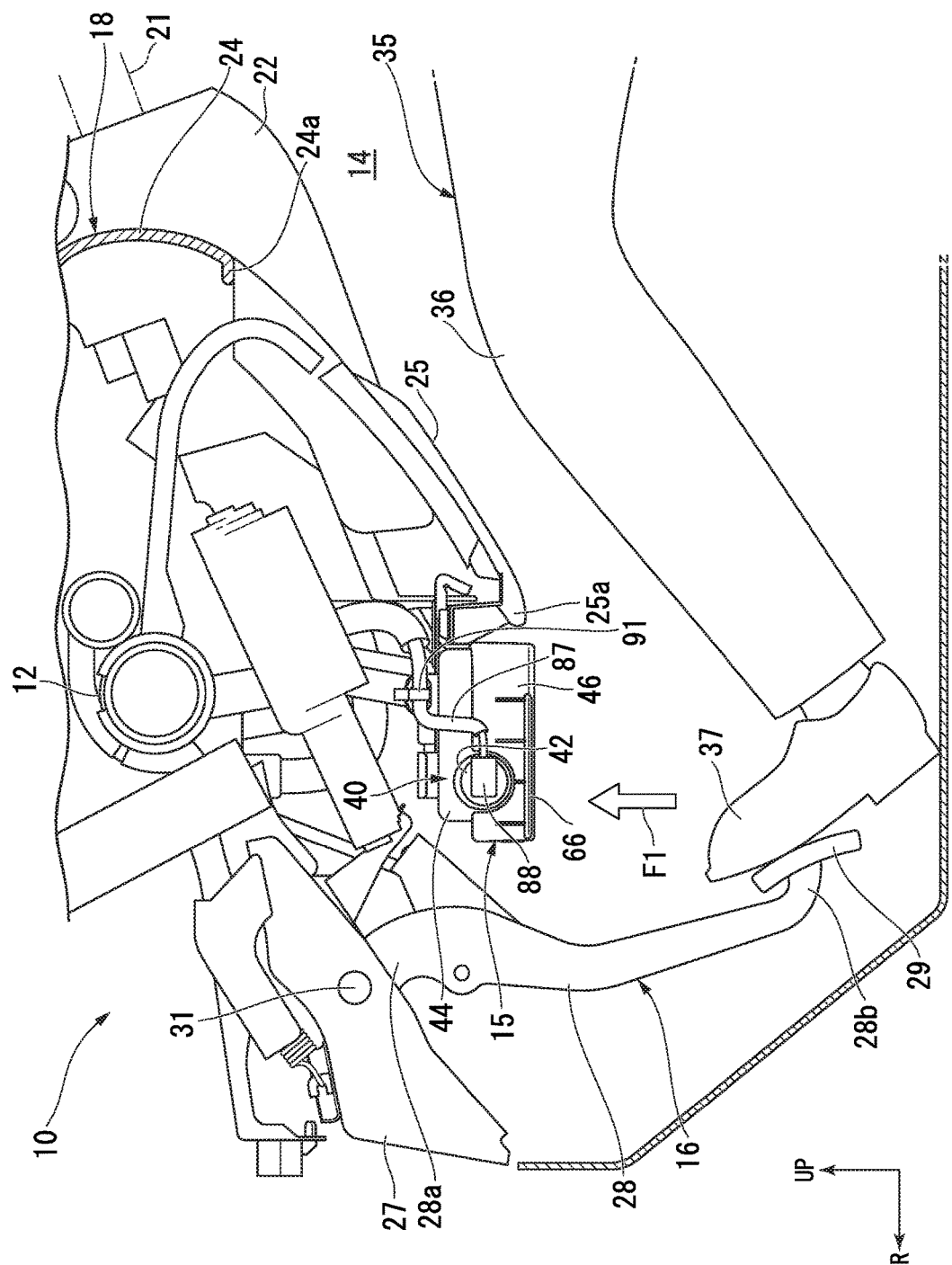
FIG. 1 is a cross-sectional view illustrating a vehicle equipped with an occupant protection device according to one embodiment of the present invention.

Next, one embodiment of the present invention will be described with reference to the drawings. In the drawings, an arrow FR indicates a front of a vehicle, an arrow UP indicates an upper side of a vehicle, and the arrow LH indicates a left side of a vehicle.

As illustrated in FIG. 1, a vehicle 10 includes a steering hanger 12 provided at a front of a vehicle in a vehicle compartment 14, an occupant protection device 15 provided below the steering hanger 12, an operating portion 16 provided in front of the occupant protection device 15 in a vehicle body, and an instrument panel 18 which covers the steering hanger 12 from a vehicle compartment 14 side.

The steering hanger 12 extends in the vehicle width direction by bridging between left and right front pillars. A steering shaft 21 is supported on the steering hanger 12 via a steering column. The steering column is covered by a column cover 22.

The instrument panel 18 includes an upper cover 24 which protrudes from a lower end of a front windshield to the column cover 22 side, and an under-cover 25 which protrudes from a lower end 24a of the upper cover 24 to the occupant protection device 15 side.

The under-cover 25 protrudes downward to be inclined from the lower end 24a of the upper cover 24 to a vicinity of a front lower end 15a of the occupant protection device 15.

The operating portion 16 includes an arm 28 of which an upper end portion 28a is rotatably supported by a support bracket 27, and an operating pedal 29 provided at a lower end portion 28b of the arm 28. The upper end portion 28a of the arm 28 is rotatably supported by the support bracket 27 via a support shaft 31.

The operating portion 16 is an accelerator pedal or a brake pedal.

The occupant protection device 15 is disposed together with the under-cover 25 below the upper cover 24. The occupant protection device 15 is a knee airbag device which is disposed below the steering hanger 12 and in front of a knee portion 36 of an occupant 35 to protect the knee portion 36.

Figure 2:
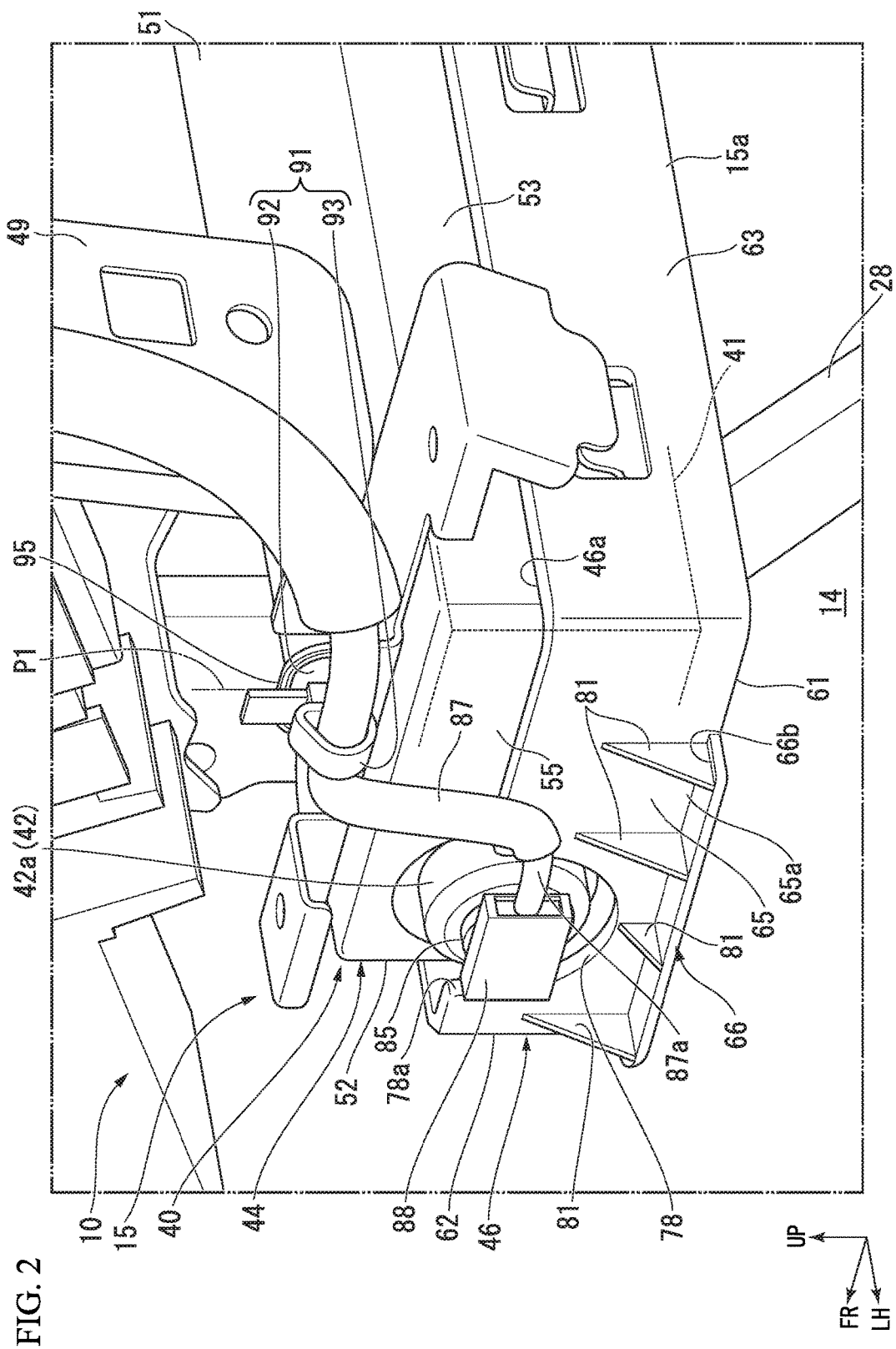
FIG. 2 is a perspective view illustrating a state in which the occupant protection device according to one embodiment of the present invention is seen from a vehicle compartment side.
Figure 3:
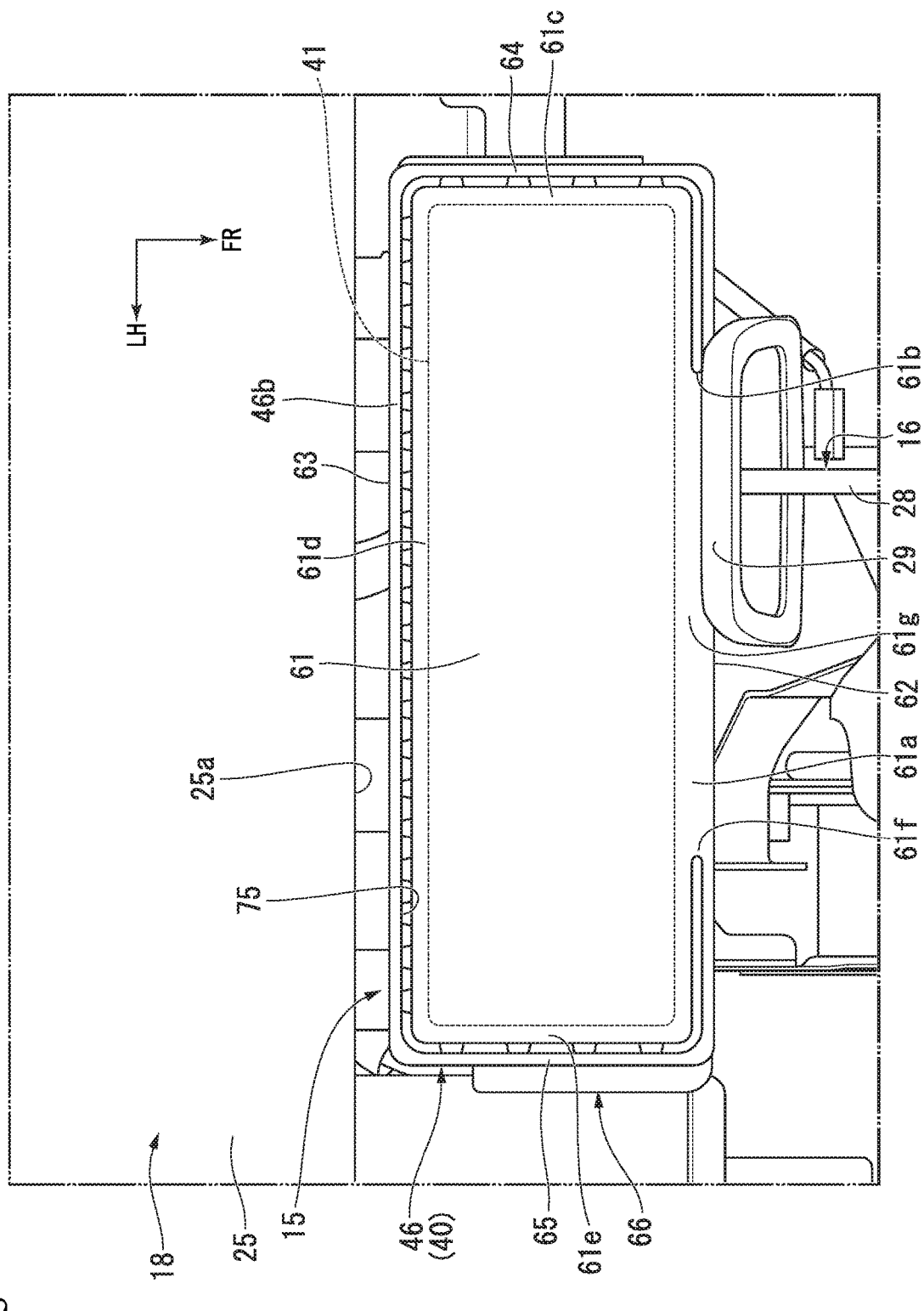
FIG. 3 is a bottom view illustrating the occupant protection device according to one embodiment of the present invention.

As illustrated in FIGS. 2 and 3, the occupant protection device 15 includes a bag body 41 which is inflated and deployed by receiving a gas pressure, an inflator 42 which supplies a high pressure gas to the bag body 41 when an impact load is input to the vehicle 10, and a case 40 which accommodates the bag body 41 and the inflator 42. The case 40 includes an accommodation case 44 which accommodates the bag body 41 and the inflator 42, and a cover portion 46 which covers the bag body 41 and the inflator 42 from a lower side thereof.

The folded bag body 41 is accommodated in the accommodation case 44 together with the inflator 42.

The accommodation case 44 has a top portion 51, a front wall 52, a rear wall 53, an inner wall, and an outer wall 55.

The top portion 51 is formed in a rectangular shape to cover an upper portion of the folded bag body 41 and is disposed approximately horizontally. The front wall 52 is bent downward from a front side of the top portion 51. The rear wall 53 is bent downward from a rear side of the top portion 51.

Further, the inner wall is bent downward from an inner side of the top portion 51. The outer wall 55 is bent downward from an outer side of the top portion 51.

The accommodation case 44 is formed by the top portion 51, the front wall 52, the rear wall 53, the inner wall and the outer wall 55 and has a rectangular body which opens downward. The accommodation case 44 is installed on a fixing member 49 on the vehicle body side. The cover portion 46 is installed on the accommodation case 44 from a lower side thereof.

The cover portion 46 has a bottom portion 61, a front wall 62, a rear wall 63, an inner wall 64, an outer wall 65 and an overhanging portion 66.

The bottom portion 61 of the cover portion 46 is disposed approximately horizontally below the top portion 51. The front wall 62 is erected from a front side of the bottom portion 61 and extends along the front side of the bottom portion 61 in the vehicle width direction. The rear wall 63 is erected from a rear side of the bottom portion 61 and extends along the rear side of the bottom portion 61 in the vehicle width direction.

The inner wall 64 is erected from an inner side of the bottom portion 61 and extends along the inner side of the bottom portion 61 in the forward and backward direction of the vehicle body. The outer wall 65 is erected from an outer side of the bottom portion 61 and extends along the outer side of the bottom portion 61 in the forward and backward direction of the vehicle body.

The cover portion 46 which has a rectangular body which has an opening 46a at an upper end thereof is formed by the bottom portion 61, the front wall 62, the rear wall 63, the inner wall 64 and the outer wall 65.

By fitting the opening 46a of the cover portion 46 into the accommodation case 44 from a lower side thereof, the opening of the accommodation case 44 is covered by the cover portion 46 from a lower side thereof. In this state, the cover portion 46 is installed at the accommodation case 44.

The front lower end 15a of the occupant protection device 15 is formed at an intersection of the bottom portion 61 and the rear wall 63.

The front lower end 15a is disposed behind the vehicle body in a lower end 24a of the upper cover 24 and extends along the lower end 24a of the upper cover 24 in the forward and backward direction of the vehicle body.

Figure 4:
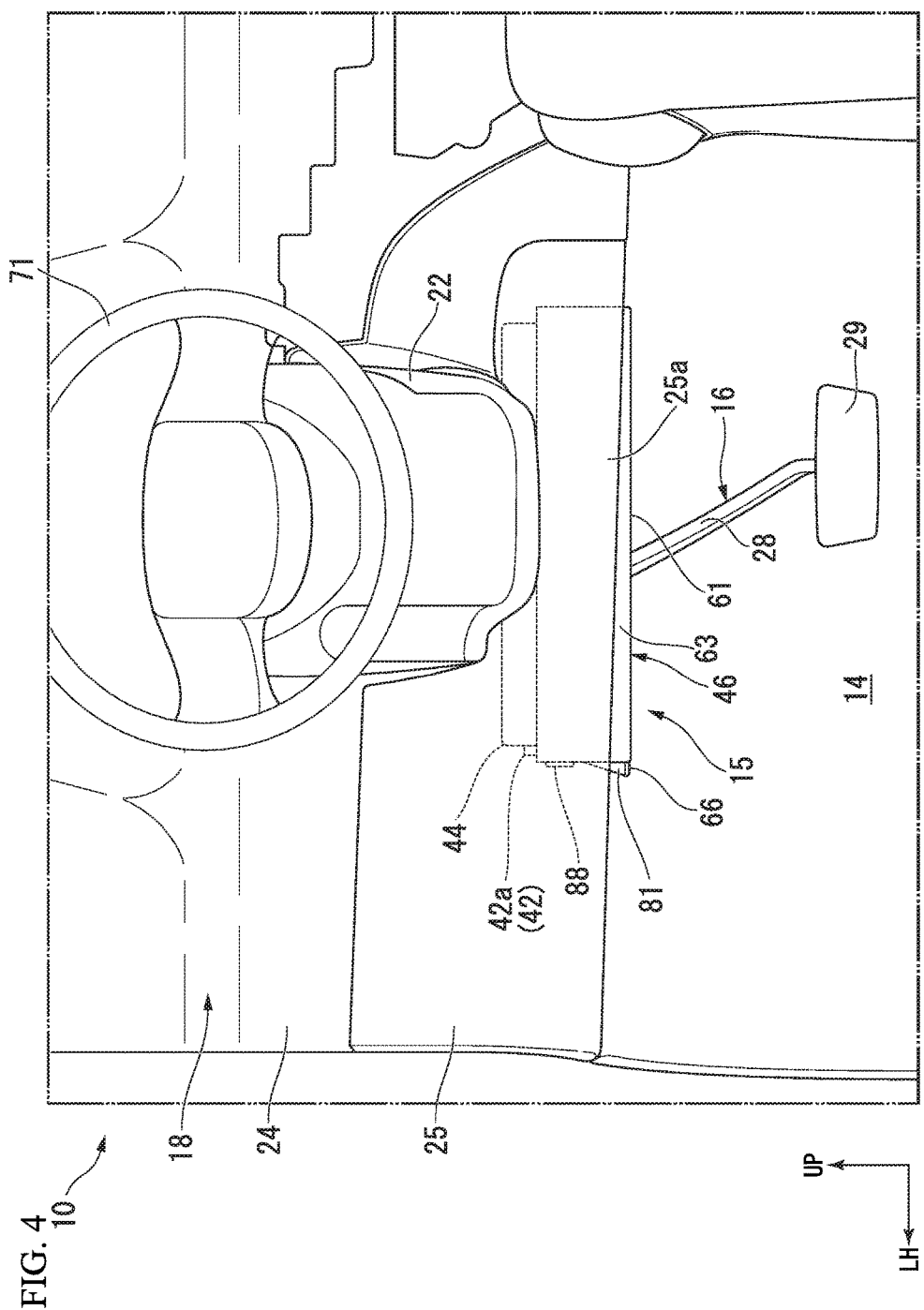
FIG. 4 is a front view illustrating the state in which the occupant protection device according to one embodiment of the present invention is seen from the vehicle compartment side.

As illustrated in FIG. 4, the occupant protection device 15 is disposed below the steering wheel 71. The bottom portion 61 of the cover portion 46 is disposed along a lower end 25a of the under-cover 25. The operating pedal 29 is disposed below the cover portion 46. The occupant protection device 15 is disposed on the vehicle body front side of the knee portion 36 (refer to FIG. 1) of the occupant 35.

Returning to FIG. 3, a breakable portion 75 is provided on the bottom portion 61 of the cover portion 46. That is, the breakable portion 75 is formed from an inner end 61b of a rear side 61a of the bottom portion 61 to an outer end 61f of the rear side 61a along an inner side 61c, a front side 61d and an outer side 61f.

The breakable portion 75 is a portion which is broken by a deploying force of the bag body 41.

The bottom portion 61 of the cover portion 46 has a central portion 61g on the rear side 61a. The central portion 61g is a portion which serves as a fulcrum when the breakable portion 75 is broken and the bottom portion 61 is opened.

Figure 5:
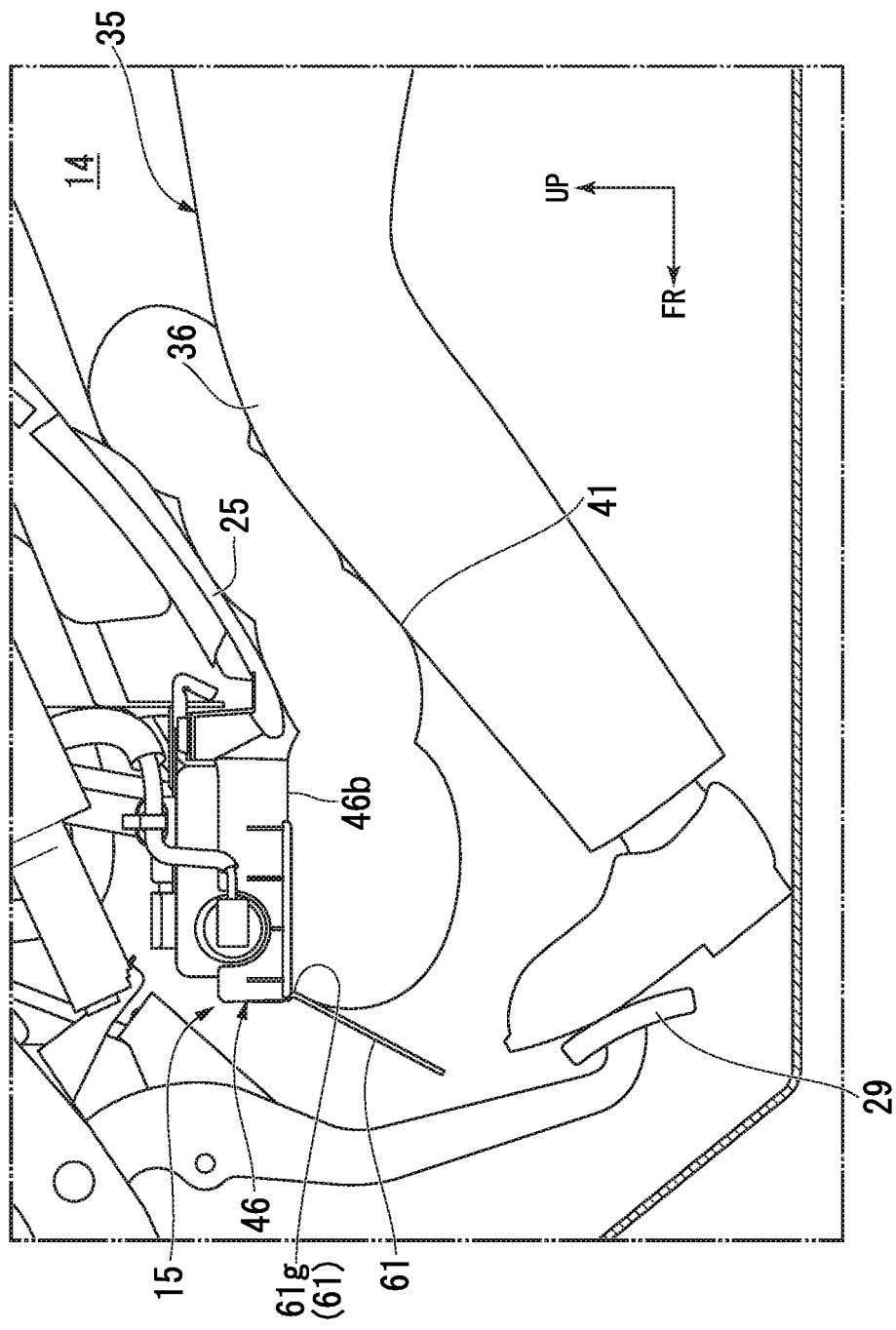
FIG. 5 is a cross-sectional view illustrating a state in which a bag body of the occupant protection device in one embodiment of the present invention is deployed.

As illustrated in FIGS. 3 and 5, a gas is supplied from the inflator 42 to the bag body 41, and the bag body 41 is inflated and deployed, whereby the breakable portion 75 is broken by the deploying force of the bag body 41. As the breakable portion 75 is broken, the bottom portion 61 of the cover portion 46 is opened downward with the central portion 61g of the rear side 61a as a fulcrum.

By opening the bottom portion 61, a lower end 46b of the cover portion 46 is opened. The bag body 41 is deployed into the vehicle compartment 14 from an opening of the lower end 46b to protect the knee portion 36 of the occupant 35.

Figure 6:
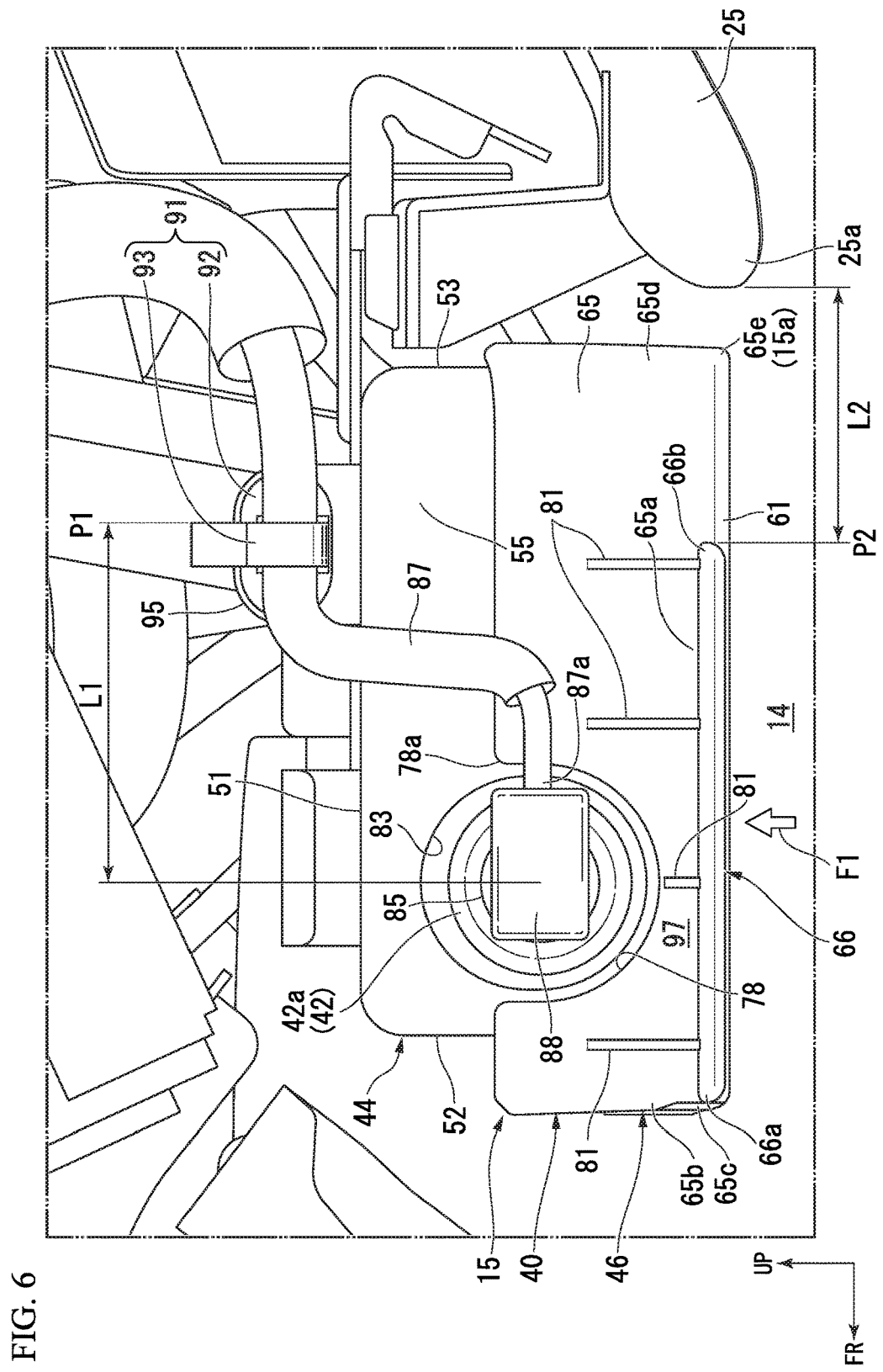
FIG. 6 is a side view illustrating the occupant protection device according to one embodiment of the present invention.

As illustrated in FIGS. 2 and 6, the outer wall 65 of the cover portion 46 is erected from the bottom portion 61 to intersect therewith (specifically, orthogonally) and also extends in the forward and backward direction of the vehicle. A concave portion 78 is formed near a front end portion 65b of the outer wall 65 in a curved shape in a state in which an upper end 78a thereof is open. The overhanging portion 66 protrudes outward from a lower side 65a of the outer wall 65 in the vehicle width direction. The overhanging portion 66 is disposed below the concave portion 78.

A plurality of gussets 81 bridge between the overhanging portion 66 and the outer wall 65.

An end portion 42a of the inflator 42 is disposed in the concave portion 78 of the outer wall 65. The end portion 42a of the inflator 42 protrudes from an opening 83 of the outer wall 65 of the accommodation case 44 toward an outside (vehicle compartment 14 side) in the vehicle width direction. The concave portion 78 of the outer wall 65 is arranged to face the opening 83 of the outer wall 65. Therefore, the end portion 42a of the inflator 42 protruding from the opening 83 is disposed in the concave portion 78.

A connector 85 is provided at the end portion 42a of the inflator 42. A harness 87 is connected to the connector 85 of the inflator 42. Specifically, a connector 88 is connected to an end portion 87a of the harness 87, and the connector 88 of the harness 87 is connected to the connector 85 of the inflator 42 from the vehicle compartment 14 side. The connector 88 of the harness 87 is disposed in the concave portion 78.

That is, the inflator 42 is connected to the harness 87 via the connector 85 and the connector 88. Therefore, when an impact load is input to the vehicle 10, an electrical signal is input from an air bag operating circuit to the inflator 42 via the harness 87, and a gas generating agent of the inflator 42 is ignited. Accordingly, a high pressure gas is supplied from the inflator 42 to the bag body 41.

Here, the harness 87 is wired along an outer surface of the outer wall 65. The overhanging portion 66 protrudes from a lower side (i.e., the lower side 65a of the outer wall 65) of the harness 87 in the vehicle width direction.

The harness 87 is supported at a position (i.e., a fixed position) P1 which is spaced apart from the connector 88 (i.e., the inflator 42) of the harness 87 by a predetermined distance L1. Specifically, a clip portion 92 of a band clip 91 is locked to a bracket 95 of the accommodation case 44. Accordingly, the band clip 91 is installed at the fixing position P1.

The harness 87 is supported by a band 93 of the band clip 91. Therefore, the harness 87 is fixed to the bracket 95 at the fixing position P1.

The overhanging portion 66 is provided below the harness 87. In addition, the plurality of gussets 81 are bridged between the overhanging portion 66 and the outer wall 65. The plurality of gussets 81 are disposed over an entire region of the overhanging portion 66 in the forward and backward direction of the vehicle body at predetermined intervals in the forward and backward direction of the vehicle body. Therefore, the overhanging portion 66 is firmly supported by the outer wall 65. Accordingly, when a load F1 is input to the overhanging portion 66 from a lower side thereof, the load F1 can be supported by the overhanging portion 66.

In addition, the overhanging portion 66 protrudes from the lower side 65a of the outer wall 65 to the lower side of the harness 87. The overhanging portion 66 is formed to have a rectangular shape in a plane view. Further, the shape of the overhanging portion 66 is not limited to a rectangular shape. For example, it is possible to form a corner portion of the overhanging portion 66 into another shape such as an inclined shape or a curved shape.

Due to the overhanging portion 66 protruding to the lower side of the harness 87, the harness 87 can be protected by the overhanging portion 66 with respect to the load F1.

Further, since the overhanging portion 66 protrudes outward from the lower side 65a of the outer wall 65 in the vehicle width direction, a space 97 is secured above the overhanging portion 66. Therefore, the connector 88 of the harness 87 can be connected to the connector 85 of the inflator 42 using the space 97. Accordingly, the harness 87 can be easily connected to the connector 85 of the inflator 42 by the connector 88.

Therefore, unlike in the prior art, it is not necessary to close the opening with the lid body after connecting the harness to the inflator. Accordingly, the harness 87 can be easily installed at the inflator 42.

An overhanging front end 66a of the overhanging portion 66 is provided on a side in front of the vehicle body, and an overhanging rear end 66b thereof is provided on a rear side of the vehicle body. The overhanging front end 66a is disposed adjacent to a lower end 65c of the front end portion 65b of the outer wall 65. The overhanging rear end 66b is provided between the connector 88 of the harness 87 and a lower end 65e of the rear end portion 65d of the outer wall 65. The lower end 65e is referred to as "rear lower end 65e".

The overhanging rear end 66b is one end portion of the overhanging portion 66 in the forward and rearward direction of the vehicle. Further, the rear lower end 65e of the outer wall 65 is an end of the outer wall 65 on the lower end 25a side of the under-cover 25.

In addition, the rear lower end 65e is a portion corresponding to an outer end of the front lower end 15a of the occupant protection device 15.

As described above, the overhanging rear end 66b is provided between the connector 88 of the harness 87 and the rear lower end 65e of the outer wall 65.

The reason why the overhanging rear end 66b is provided between the connector 88 and the rear lower end 65e is as follows.

That is, for example, when the overhanging rear end 66b extends to the rear lower end 65e of the outer wall 65, there is a high likelihood that the overhanging rear end 66b side of the overhanging portion 66 will be seen by the occupant 35 (particularly, an occupant sitting on a rear seat) from the vehicle compartment 14 side.

Therefore, the overhanging rear end 66b is provided between the connector 88 of the harness 87 and the rear lower end 65e of the outer wall 65. Thus, the overhanging rear end 66b can be relatively distantly separated from the lower end 25a of the under-cover 25 toward a front side of the vehicle compartment 14. Accordingly, in particular, it becomes difficult for an occupant sitting on the rear seat to visually recognize the overhanging portion 66, and a design of the vehicle compartment 14 can be enhanced.

Here, at the fixed position P1 which is spaced apart from the inflator 42 by the predetermined distance L, the harness 87 is installed at the bracket 95 via the band clip 91. Further, the overhanging portion 66 extends to a position (i.e., fixed corresponding position) P2 corresponding to the fixed position P1 in a lower direction of the vehicle. That is, the overhanging portion 66 extends to a lower side of the fixed position P1.

Since the overhanging portion 66 extends to the lower side of the fixed position P1, the load F1 acts on the harness 87 from the vehicle compartment 14 side (i.e., lower side) between the inflator 42 of the harness 87 and the fixed position P1, and movement of the harness 87 can be restricted by the overhanging portion 66.

Therefore, a connection portion between the inflator 42 and the harness 87 can be protected. In particular, the end portion 87a of the harness 87 connected to the connector 88 of the harness 87 can be protected from the load F1.

Returning to FIG. 1, the operating pedal 29 is located below the cover portion 46. Further, the overhanging portion 66 is disposed on the operating pedal 29 side from the harness 87. In other words, the overhanging portion 66 is disposed between the harness 87 and the operating pedal 29. Therefore, the overhanging portion 66 is disposed above a foot 37 of the occupant 35 who operates the operating pedal 29. Thus, the harness 87 can be reliably protected from the foot 37 of the occupant 35 by the overhanging portion 66.

Further, the technical scope of the present invention is not limited to the above-described embodiment, and various modifications can be made without departing from the gist of the present invention.

For example, in the above-described embodiment, the outer wall 65 is exemplified as the side surface extending in the forward and backward direction of the vehicle, but the present invention is not limited thereto. For example, the side surface extending in the forward and backward direction of the vehicle may be the inner wall 64.

Further, in the above-described embodiment, an example in which the occupant protection device 15 is disposed on the side of the steering wheel 71 and the operating portion 16 (i.e., driver's seat side) of the vehicle compartment 14 has been described, but the present invention is not limited thereto. For example, it is also possible to dispose the occupant protection device 15 on a passenger seat side.

Further, in the above-described embodiment, an example in which the overhanging portion 66 protrudes from the lower side 65a of the outer wall 65 in the vehicle width direction has been described, but the present invention is not limited thereto. The overhanging portion 66 may be provided below the harness 87 and may be provided above the lower side 65a of the outer wall 65.

When the overhanging portion 66 is provided above the lower side 65a of the outer wall 65, it is possible to make the occupant more hardly visually recognize the overhanging portion 66, and the design of the vehicle compartment 14 can be further enhanced.

Further, in the above-described embodiment, an example in which the overhanging portion 66 is provided on the outer wall 65 has been described, but the present invention is not limited thereto. For example, when the end portion 42a of the inflator 42 is disposed on the outer wall 65 side, it is also possible to provide the overhanging portion 66 on the inner wall 64.

What is claimed is:

1. An occupant protection device which is disposed together with an under-cover of an instrument panel, has a harness connected to an inflator to protect a knee portion of an occupant, the occupant protection device comprising:
a case in which a first surface is disposed along a lower end of the under-cover and the harness is disposed on a side surface intersecting the first surface and extending in forward and backward direction of a vehicle, and
an overhanging portion provided protruding from a side wall of the case on a side below the harness in a vehicle width direction,
wherein the harness is wired along an outer surface of the side wall, and
a plurality of gussets are provided bridging the overhanging portion and the side wall.

2. The occupant protection device according to claim 1, wherein the harness is connected to the inflator by a connector.

3. The occupant protection device according to claim 2, wherein one end portion of the overhanging portion in the forward and backward direction of the vehicle is provided between the connector and an end portion of the under-cover on a lower end side in the side wall.

4. The occupant protection device according to claim 1, wherein the harness is fixed at a position which is spaced apart from the inflator, and the overhanging portion extends to a position corresponding to a downward direction of the vehicle at the position at which the harness is fixed.

5. The occupant protection device according to claim 1, wherein an operating pedal is located below the case, and the overhanging portion is disposed on an operating pedal side of the harness.

* * * * *